United States Patent
Vitrano et al.

(10) Patent No.: US 10,815,398 B2
(45) Date of Patent: Oct. 27, 2020

(54) POLYOLEFIN BASED HOT MELT CONTAINING A SOLID PLASTICIZER

(75) Inventors: Michael D. Vitrano, West Allis, WI (US); Kevin Stafeil, Delafield, WI (US); Tsebaot Hailemichael, Brown Deer, WI (US)

(73) Assignee: BOSTIK, INC., Wauwatosa, WI (US)

(*) Notice: Subject to any disclaimer, the term of this patent is extended or adjusted under 35 U.S.C. 154(b) by 115 days.

(21) Appl. No.: 13/442,579

(22) Filed: Apr. 9, 2012

(65) Prior Publication Data
US 2012/0259050 A1  Oct. 11, 2012

Related U.S. Application Data

(60) Provisional application No. 61/473,563, filed on Apr. 8, 2011.

(51) Int. Cl.
| C09J 123/08 | (2006.01) |
| C09J 193/04 | (2006.01) |
| C08L 25/02 | (2006.01) |
| C08K 5/00 | (2006.01) |
| C08L 53/00 | (2006.01) |

(52) U.S. Cl.
CPC ....... C09J 123/0815 (2013.01); C08K 5/0016 (2013.01); C08L 25/02 (2013.01); C08L 53/00 (2013.01); C09J 193/04 (2013.01); *Y02P 20/582* (2015.11)

(58) Field of Classification Search
CPC . C09J 123/0815; C09J 193/04; C08K 5/0016; C08L 25/02; C08L 53/00
USPC ........................................ 524/293
See application file for complete search history.

(56) References Cited

U.S. PATENT DOCUMENTS

| 5,624,986 A | 4/1997 | Bunnelle et al. |
| 5,747,573 A | 5/1998 | Ryan |
| 6,034,159 A | 3/2000 | Malcolm |
| 6,582,829 B1* | 6/2003 | Quinn et al. .................. 428/513 |
| 6,657,000 B1 | 12/2003 | De Keyzer et al. |
| 7,241,837 B2 | 7/2007 | Yaguchi et al. |
| 8,921,474 B2 | 12/2014 | Alper et al. |
| 2007/0207299 A1* | 9/2007 | Quinn .......................... 428/219 |
| 2013/0090421 A1* | 4/2013 | Vitrano et al. ................ 524/505 |
| 2014/0187695 A1* | 7/2014 | Keuler et al. ................. 524/291 |
| 2016/0002508 A1* | 1/2016 | Kanderski .............. C09J 7/0221 428/32.22 |

FOREIGN PATENT DOCUMENTS

| JP | 9302319 | 11/1997 |
| WO | WO 01/34719 | 5/2001 |
| WO | 2011022523 | 2/2011 |

OTHER PUBLICATIONS

Escorez 5300 Tackifying Resin, Product Datasheet, ExxonMobil, effective date Feb. 16, 2017.*
International Search Report and Written Opinion, PCT International Application No. PCT/US2012/032773, dated May 23, 2012.
Krayton Polymers U.S. LLC, Data Sheet for KRATON G1657 M Polymer, Feb. 15, 2017, 3 pages, Identifier: K131DDp17U.

* cited by examiner

*Primary Examiner* — Nicholas E Hill
(74) *Attorney, Agent, or Firm* — Christopher R. Lewis

(57) ABSTRACT

A hot melt adhesive that is composed of a metallocene catalyzed polyethylene polymer, a hydrogenated styrenic block copolymer, a tackifying resin, and a solid plasticizer. The preferred polyethylene polymer is an ethylene-octene copolymer, and the preferred styrenic block copolymer is a styrene-ethylene-butylene-styrene having less than 30% styrene content. The preferred solid plasticizer is either glycerol tribenzoate or 1,4-cyclohexane dimethanol dibenzoate.

10 Claims, No Drawings

POLYOLEFIN BASED HOT MELT CONTAINING A SOLID PLASTICIZER

CROSS REFERENCE TO RELATED APPLICATIONS

The present application claims the benefit of priority under 35 U.S.C. § 119(e) to U.S. Provisional Application No. 61/473,563 filed on Apr. 8, 2011, the content of which is incorporated herein by reference in its entirety.

BACKGROUND OF THE INVENTION

The present invention relates to hot melt adhesives, and more specifically to a hot melt adhesive that is composed of a metallocene catalyzed polyethylene polymer, a hydrogenated styrenic block copolymer, a tackifying resin, and a solid plasticizer.

Historically, adhesive formulators have struggled to impart low viscosity, fast set speed, superior adhesion, and reduced cold flow and/or blocking to their products. Many of these properties are mutually exclusive using conventional raw materials and formulation techniques. This invention details a novel way a hot melt formulator can impart low viscosity, fast set speed, superior adhesion, and reduced cold flow and/or blocking to their products without compromising other properties.

Adhesives used to laminate thin and/or porous substrates such as nonwovens used in the construction of disposable diapers cannot exhibit cold flow, blocking, or migration. Traditional ethylene/vinyl acetate copolymers (EVA), amorphous polyalpha-olefins (APAO) and styrenic block copolymer (SBC) based adhesives used to laminate or bond thin and/or porous substrates typically struggle with the balance of reducing cold flow, migration, and/or blocking, while increasing adhesion properties.

Adhesives used in applications in which substrates are laminated, are often required to adhere to a wide variety of surface characteristics (treatments, recycled content, porosity). The substrates themselves can also vary in physical characteristics, such as rigidity, density, and chemical make-up. As a result, adhesives must be formulated to overcome these obstacles. Consequently, adhesive formulators are continuously evaluating new materials and novel formulation strategies in order to develop an adhesive with the broadest possible application window. An adhesive's application window is defined as an adhesive's ability to overcome an application's deficiencies and/or manufacturing variables. The current invention details a novel way a hot melt formulator can maximize properties beneficial to lamination applications.

Historically, adhesive formulators have had to balance fast set speed with adhesion. Faster setting adhesives typically have poorer adhesion. Increasing the adhesion properties of a traditionally formulated low viscosity adhesive will also cause that adhesive to exhibit more cold flow and/or blocking. Cold flow being defined as the tendency of the adhesive to flow or "creep" under low pressure at relatively low temperatures. Blocking is defined as the undesired adhesion of a coated adhesive to substrates it comes into contact with during shipping and/or storage.

Over the years, adhesive formulators have utilized a variety of different polymers as well as other additives in their formulations to obtain a balance of these attributes. These polymers include, but are not limited to, polyolefins (ethylene- or propene-based polymers), styrenic-based copolymers (both saturated and unsaturated mid-blocks), functionalized polyolefins (ethylene or propene copolymers with oxygen containing monomers), or APAOs (ethylene-, propene-, or butene copolymers), and EVA (ethylene vinyl acetate).

It is also known to use solid plasticizers in hot melt adhesives. For example, U.S. Pat. Nos. 5,026,756 and 5,091,454 both discuss the use of solid plasticizers, specifically 1,4-cyclohexane dimethanol dibenzoate in hot melt adhesives. They are both directed towards the use of solid plasticizers in EVA based adhesives, although there is also one example each of an SIS based product and one based on a polyamide. No mention is made of polyethylene or SEBS as polymer bases for adhesives.

U.S. Pat. No. 5,624,986 as well as U.S. Pat. Nos. 5,853,864 and 5,627,229 discuss the use of solid plasticizers, but they all relate to adhesives that cold flow for a period of time before they solidify. End uses include high wet strength cores for diapers, palletizing adhesives and cigarette cartons. The examples include EVA, SBC polymers and others, but don't mention metallocene catalyzed polyalphaolefins.

U.S. Pat. No. 6,582,829 discloses combinations of ethylene/alpha-olefins and block copolymers used in hot melt adhesives, but doesn't talk about combinations with solid plasticizers.

U.S. Pat. No. 6,034,159 discloses a bookbinding adhesive made from an SIS block copolymer, tackifying resin, a high melt point synthetic wax, a solid benzoate plasticizer, and up to 15% of a compatible polymer which may include ethylene based polymers.

U.S. Pat. No. 5,747,573 discloses a hot melt composed of an amorphous polyalphaolefin, a solid benzoate plasticizer, and a tackifier.

SUMMARY OF THE INVENTION

The invention is based on the use of a polyolefin polymer based on metallocene catalyst technology, a tackifier, a styrenic block copolymer, and a solid plasticizer.

The invention provides hot melt adhesive formulations, preferably composed of a polyethylene polymer based on metallocene catalyst technology, tackifying resin, a styrenic block copolymer and a solid plasticizer. These formulations provide superior hot tack, adhesion characteristics, resistance to blocking and/or cold flow, and fast set speed over traditional EVA, APAO and SBC adhesives. Applications include, but are not limited to, disposable gowns, heat reactive tapes, diapers, sanitary pads, case and carton seal, book binding, general assembly, and filtration.

Accordingly, in one aspect, there is provided a hot melt adhesive composition comprising;
 (a) about 20% to 60% by weight of a metallocene catalyzed polyolefin polymer;
 (b) about 15% to 65% by weight of a tackifying resin;
 (c) about 2% to 20% by weight of a styrenic block copolymer; and
 (d) about 2% to 25% by weight of a solid plasticizer.

In another aspect, the polyolefin is a polyethylene polymer.

In yet another aspect, the metallocene catalyzed polyethylene polymer is a copolymer of ethylene and a C4 to C8 alpha-olefin comonomer. The comonomer is preferably butene-1 or octene-1. The ethylene-based copolymer has a melt index greater than 100 g/10 minutes, preferably greater than 200 g/10 minutes, and most preferably greater than 500 g/10 minutes. The ethylene-based copolymer is more preferably present in the range of about 30% to about 60% by weight, and is most preferably present in the range of about 40% to about 60% by weight.

In still another aspect, the tackifying resin is selected from aliphatic and cyclo-aliphatic petroleum hydrocarbon resins, hydrogenated aliphatic and cyclo-aliphatic petroleum hydrocarbon resins, hydrogenated aromatic petroleum hydrocarbon resins, aliphatic/aromatic petroleum derived hydrocarbon resins, hydrogenated aliphatic/aromatic derived hydrocarbon resins, aromatic modified cyclo-aliphatic resins, hydrogenated aromatic modified cyclo-aliphatic resins, polyterpene resins, copolymers and terpolymers of natural terpenes, and mixtures thereof. Preferably, the tackifying resin has a softening point equal to or greater than 90° C., and is present in the range of about 30% to about 60% by weight.

In still another aspect, the styrenic block copolymer is present in an amount of from about 2% to about 20% by weight, preferably from about 2% to about 15% by weight, and most preferably from about 2% to about 12% by weight, and is selected from styrene-butadiene (SB), styrene-butadiene-styrene (SBS), styrene-isoprene-styrene (SIS), styrene-isoprene (SI), styrene-isoprene-butadiene-styrene (SIBS), styrene-ethylene-butylene-styrene (SEBS), styrene-ethylene-butylene (SEB), styrene-ethylene, propylene-styrene (SEPS), styrene-ethylene-propylene (SEP) and styrene-ethylene-ethylene-propylene-styrene (SEEPS). Preferably, the styrenic block copolymer is an SIS, SEBS, SEPS, SEP or SEEPS. Also, its styrene content is preferably about 10% to about 30% by weight, more preferably about 10% to about 20% by weight. Most preferably, the styrenic block copolymer is an SEPS having a styrene content of about 13% by weight.

In still another aspect, the plasticizer has a softening point equal to or greater than 60° C., and is preferably selected from glycerol tribenzoate and 1,4-cyclohexane dimethanol dibenzoate.

As the adhesive composition of the present invention will typically be used in spray applications, its Brookfield viscosity measured at 325° F. should be 20,000 centipoise (cP) or less, preferably 15,000 cP or less, and most preferably 10,000 cP or less.

DESCRIPTION OF THE INVENTION

It has been discovered that a combination of a polyolefin polymer, preferably a polyethylene polymer, based on metallocene catalyst technology, a tackifier, a styrenic block copolymer, and a solid plasticizer can be incorporated into hot melt adhesive formulas that will exhibit a fast set speed, improved hot tack and increased adhesion characteristics, while resisting blocking and cold flow.

More recently, metallocene catalysis has been used to make polyolefins with more precisely tailored properties. For example, the molecular weight of the polymer can be controlled in a way not possible with the older Ziegler-Natta catalysts. Ethylene based polymers can be made using high levels of comonomer, such as butene-1 and octene-1, to produce polymers with very low levels of crystallinity and density. These polymers have been used to make hot melt adhesives with more desirable properties than those based on the previous generations of polyolefins. Examples of these metallocene polymers include Affinity® and Engage® polymers from Dow Chemical Company. Polymers and adhesives of this type are described in U.S. Pat. Nos. 6,107,430 and 6,319,979, both of which are specifically incorporated herein by reference.

Olefin copolymers based on ethylene and at least one α-olefin are one component of the adhesive. These copolymers are manufactured by metallocene catalysis. One embodiment of the invention uses such co- or terpolymers based on ethylene together with $C_4$ to $C_{20}$ α-olefins. The comonomers that can be additionally added to the ethylene are the olefinic unsaturated monomers known to be copoymerizable with ethylene.

They particularly concern linear or branched $C_4$ to $C_{20}$ α-olefins, such as butene, hexene, methylpentene, octene, cyclic unsaturated compounds like norbornene or nobornadiene; symmetrically or unsymmetrically substituted ethylene derivatives, wherein $C_1$ to $C_{12}$ alkyl groups are suitable substituents; as well as unsaturated carboxylic acids or carboxylic acid anhydrides.

The adhesive contains about 20 to 60 percent by weight of the metallocene based polyolefin polymer, more preferably about 30% to about 60% by weight, and most preferably about 40% to about 60% by weight. The polymer preferably has a relatively high melt index when run according to ASTM 1238 using a temperature of 190° C. and a weight of 2.16 kg. Preferably the melt index is greater than 100 g/10 minutes, more preferably greater than 200 g/10 minutes and most preferably greater than 500 g/10 minutes, and up to 2000 g/10 minutes. Two grades of ethylene/octene copolymers which are particularly useful are Affinity GA 1900 and Affinity GA 1950, which have melt indexes of 1000 g/10 minutes and 500 g/10 minutes respectively. These polymers are available from Dow Chemical Company.

The adhesives of the invention contain a tackifying resin in combination with a metallocene catalyzed thermoplastic polyolefin, styrenic block copolymer and the solid plasticizer. The tackifying resins are selected for a specific degree of compatibility with the polymer and plasticizer.

The tackifying resins or tackifiers which are used in the hot melt adhesives of the present invention are those which extend adhesive properties and improve specific adhesion. As used herein, the term "tackifying resin" include:

(a) aliphatic and cycloaliphatic petroleum hydrocarbon resins having Ring and Ball softening points of from 10° C. to 160° C., as determined by ASTM method E28, the latter resins resulting from the polymerization of monomers consisting primarily of aliphatic and/or cycloaliphatic olefins and diolefins; also included are the hydrogenated aliphatic and cycloaliphatic petroleum hydrocarbon resins; examples of such commercially available resins based on a C5 olefin fraction of this type are Piccotac 95 tackifying resin sold by Hercules Corp. and Escorez 1310LC sold by Exxon-Mobil Chemical Company;

(b) Aromatic petroleum hydrocarbon resins and the hydrogenated derivatives thereof;

(c) Aliphatic/aromatic petroleum derived hydrocarbon resins and the hydrogenated derivatives thereof;

(d) Aromatic modified cycloaliphatic resins and the hydrogenated derivatives thereof;

(e) Polyterpene resins having a softening point of from about 10° C. to about 140° C., the latter polyterpene resins generally resulting from the polymerization of terpene hydrocarbons, such as the mono-terpene known as pinene, in the presence of Friedel-Crafts catalysts at moderately low temperatures; also included are the hydrogenated polyterpene resins; and (f) Copolymers and terpolymers of natural terpenes, styrene/terpene, α-methyl styrene/terpene and vinyl toluene/terpene.

Mixtures of two or more of the above described tackifying resins may be required for some formulations. Although a range of 15% to 65% by weight tackifying resin may be used, the preferred amount is from about 30% to about 60% by weight. Tackifying resins which are useful for the present invention can perhaps include polar tackifying resins, however, the choice of available polar tackifying resins is limited in view of the fact that many of the polar resins appear only partially compatible with the polyolefin polymers.

As noted above, tackifying resins which are useful within the scope of the present invention comprise about 15% to 65% by weight. Preferably, the tackifying resins can be selected from any of the relatively nonpolar types, which are commercially available. Preferred resins include aliphatic petroleum hydrocarbon resins examples of which are based on $C_5$ olefins such as Hercotac 1148 available from Eastman Chemical. Aromatic modified C5 resins, such as Piccotac 9095 available from Eastman Chemical or Wingtack STS, available from Cray Valley Chemicals are also preferred. Other preferred resins are hydrogenated dicyclopentadiene (DCPD) based or aromatically modified derivatives thereof. Examples of such resins are Escorez 5400 and Escorez 5600, respectively, sold by ExxonMobil Chemical Company. The Ring & Ball Softening Point, as determined by ASTM E-28, of the tackifying resin(s) should be greater than 70° C., preferably greater than 80° C. and most preferably greater than 90° C., but not more than 140° C. and preferably not more than 125° C.

A plasticizer is broadly defined as a typically organic composition that can be added to rubbers and other resins to improve extrudability, flexibility, workability, or stretchability. Typical plasticizers in adhesives are plasticizing oils that are liquid at ambient temperature. The plasticizer used in the adhesives of the invention is typically a solid composition at ambient temperature having a Ring & Ball softening point of at least 45° C. Preferably, the plasticizer composition has a Ring & Ball softening point of at least 60° C. Increased softening points (60°-130° C.) can aid in improving heat resistance or preventing bond failure at high temperatures.

The solid plasticizer serves to improve hot tack and specific adhesion while increasing set speed, but also decreases the amount of pressure sensitivity. Historically, liquid plasticizers, waxes, and/or other diluents have been used to modify hot tack, adhesion properties and viscosity, but liquid plasticizer increases pressure sensitivity and makes the adhesive softer which in turn increases blocking and bleed through.

One useful class of plasticizers used in the invention comprises a cyclo-aliphatic or aromatic ester of a benzene dicarboxylic acid. Such plasticizers are prepared by forming an ester from a cyclo-aliphatic or aromatic alcohol such as cyclohexanol, phenol, naphthol, or other monohydroxy alcohol compounds having from 5 to 12 carbon atoms. The ester compounds are formed from dicarboxylic acid compounds, typically phthalic acids. Phthalic acids that can be used in the plasticizers are 1,2-benzene dicarboxylic acids, 1,3-benzene dicarboxylic acid (isophthalic acid), or 1,4-benzene dicarboxylic acid (terephthalic acid). The preferred plasticizers of this class comprise dicyclohexyl phthalate or diphenyl phthalate. Most preferably, dicyclohexyl orthophthalate is used.

A second class of useful plasticizers comprise an aromatic carboxylic acid ester of a cycloaliphatic polyfunctional alcohol having 2 to 10 hydroxy groups. Specific examples of preferred hydroxy compounds include 1,4-cyclohexane dimethanol, and other useful cycloaliphatic polyfunctional hydroxyl compounds. Aromatic carboxylic acids that can be used with the cycloaliphatic polyfunctional alcohols to form this class of ester plasticizer compounds of the invention typically have at least one aromatic group and at least one carboxyl function. Representative acids include benzoic acid, naphthanoic acid, and 4-methyl benzoic acid.

The most preferred plasticizer is a solid with a Ring & Ball softening point above about 60° C. and belongs to the class of plasticizers called benzoates. Specific examples include glycerol tribenzoate with a softening point of 71° C. and cyclohexane dimethanol dibenzoate compounds. A 1,4-cyclohexane dimethanol dibenzoate is exemplified and has a softening point of 118° C. It is available from Eastman Chemical under the name Benzoflex 352.

Other solid plasticizers are known and can be used in the formulations of the present invention. These include sucrose benzoate, glycerol benzoate among others. However, it is desired that the solid plasticizer have a softening point of greater than 60° C.

The amount of the solid plasticizer can vary widely from as low as about 2% to as much as 25%, preferably about 2% to about 20%, and most preferably about 2% to about 15%, by weight.

Any type of elastomeric block copolymer can be used in a hot melt adhesive formula according to the present invention, and may be incorporated into the composition in amounts of from about 2% to about 20% by weight, preferably from about 2% to about 15% by weight, and most preferably from about 2% to about 12% by weight. Among the useful elastomeric block copolymers are those having structure A-B, A-B-A, A-(B-A)$_n$-B, or (A-B)$_n$-Y wherein A comprises a polyvinyl aromatic block having a Tg higher than 80° C., B comprises a rubbery midblock having a Tg lower than −10° C., Y comprises a multivalent compound, and n is an integer of at least 3.

Examples of these latter block copolymers conventionally used in hot melt adhesive compositions are styrenic block copolymers (SBC) and include styrene-butadiene (SB), styrene-butadiene-styrene (SBS), styrene-isoprene-styrene (SIS), styrene-isoprene (SI), styrene-isoprene-butadiene-styrene (SIBS), styrene-ethylene-butylene-styrene (SEBS), styrene-ethylene-butylene (SEB) styrene-ethylene propylene-styrene (SEPS) and styrene-ethylene propylene (SEP) and styrene-ethylene-ethylene-propylene-styrene (SEEPS or hydrogenated SIBS). While the total styrene content of the polymers can be as much as 51 wt-% of the polymer, and since the polymers can have more than two A blocks for optimal performance, the total A block should be less than or equal to about 45 wt-% of the polymers, and, most preferably, is less than or equal to35 wt-% of the polymer. In an S-B-S (styrene-butadiene-styrene) copolymer, the preferred molecule weight is about 50,000 to 120,000, and the preferred styrene content is about 20 to 45 wt-%. In an S-I-S (styrene-isoprene-styrene) copolymer, the preferred molecular weight is about 190,000 to 200,000 and the preferred styrene content is about 14-35 wt-%. Hydrogenating the butadiene midblocks produces rubbery midblocks that are typically converted to ethylene-butylene midblocks and is referred to as a SEBS polymer. The most preferred polymers are SIS, SEBS and SEPS and SEEPS block copolymers containing less than 30% styrene. Particularly preferred is the SEBS polymer referred to as Kraton 1657 which can be obtained from Kraton Performance Polymers limited. It is an SEBS block copolymer with a styrene content of 12% by weight and a solution viscosity (20% by weight in toluene) of 1500 centipoise at 25° C.

Such block copolymers are available for example from Kraton Polymers, Polimeri Europa, Total Petrochemicals, Dexco, and Kuraray.

Although the examples illustrate a hot melt adhesive comprised of a polyethylene polymer based on metallocene catalyst technology, a tackifying resin, a styrenic block copolymer and a solid plasticizer, it has been found that other supplemental polymers could also be used to provide specific desired functionality, including but not limited to ethylene vinyl acetate copolymers, propylene/ethylene copolymers, ethylene/alpha-olefin copolymers, ethylene n-butyl acrylate copolymers, etc.

Hot melts of the present invention may also contain relatively small amounts of other auxiliary agents such as plasticizing oils, waxes or other additives as long as they don't detract from the performance of the adhesive, they don't increase tack to any appreciable degree. If they are present, the amount of such auxiliary agents will generally be below 10 percent by weight.

A suitable plasticizing oil useful as an auxiliary agent may be selected from the usual oils, such as mineral oil, and polybutene.

Waxes can also be used as an auxiliary agent in the adhesive composition, and are used to reduce the melt viscosity of the hot melt construction adhesives without appreciably decreasing their adhesive bonding characteristics. These waxes also are used to reduce the open time of the composition without affecting the temperature performance.

The wax material component of the adhesive is optional but when included may comprise up to about 10% by weight, preferably only up to 5% by weight, of the adhesive composition.

Among the useful wax materials are:

(1) Low molecular weight, that is, 100-6000 g/mol, polyethylene having a hardness value, as determined by ASTM method D-1321, of from about 0.1 to 120 and ASTM softening points of from about 66° C.° to 120° C.;

(2) Petroleum waxes such as paraffin wax having a softening point of from about 130° to 170° F. and microcrystalline wax having a softening point of from about 135° to 200° F., the latter softening points being determined by ASTM method D127-60;

(3) metallocene catalyzed propylene-based wax like those commercialized by Clariant under the name "Licocene".

(4) metallocene catalyzed wax or single-site catalyzed wax like for example those described in U.S. Pat. Nos. 4,914,253, 6,319,979 or WO 97/33921 or WO 98/03603.

(5) synthetic waxes made by polymerizing carbon monoxide and hydrogen such as Fischer-Tropsch wax; and (6) polyolefin waxes. As used herein, the term "polyolefin wax" refers to those polymeric or long-chain entities comprised of olefinic monomer units. These materials are commercially available from Eastman Chemical Co. under the trade name "Epolene." The materials which are preferred to use in the compositions of the present invention have a Ring and Ball softening point of 200° F. (93° C.) to 350° F. (177° C.).

As should be understood, each of these waxes is solid at room temperature. Other useful substances include hydrogenated animal, fish and vegetable fats and oils such as hydrogenated tallow, lard, soy oil, cottonseed oil, castor oil, etc., and which are solid at ambient temperature by virtue of their being hydrogenated, have also been found to be useful with respect to functioning as a wax material equivalent. These hydrogenated materials are often referred to in the adhesives industry as "animal or vegetable waxes".

The adhesive also typically includes a stabilizer or antioxidant. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the adhesive as well as in the ordinary exposure of the final product to the ambient environment. Such degradation is usually manifested by deterioration in the appearance, physical properties and performance characteristics of the adhesive. A particularly preferred antioxidant is Irganox 1010, a tetrakis(methylene (3,5-di-teri-butyl-4-hydroxyhydrocinnamate))methane manufactured by BASF among others.

The adhesives of the invention were prepared using the following procedure:

The adhesive composition useful in the method of the present invention may be produced using any of the techniques known in the art. A representative example of the procedure involves placing all of the liquid substances in a jacketed mixing kettle and preferably in a jacketed heavy duty mixer of the Baker-Perkins or Day type, and which is equipped with rotors, and thereafter raising the temperature of this mixture to a range of 120° C. to 177° C. The solid tackifying resins and other additives are then added and melted to form a homogeneious mixture. Finally, the polymer is added and mixed until completely blended in. It should be understood that the precise temperature to be used in this step would depend on the melting point of the particular ingredients and the viscosity of the finished adhesive. The resulting adhesive composition is agitated until the polymers completely dissolve. A vacuum is then applied to remove any entrapped air.

The following materials were used:

Escorez 5600 is a hydrogenated aromatic modified cycloaliphatic hydrocarbon resin with a 100° C. softening point. It is available from ExxonMobil Chemical.

Kaydol is a white mineral oil available from Sonneborn, Inc.

Irganox 1010 is a hindered phenolic antioxidant. It is available from Ciba Specialty Chemicals.

Affinity GA 1950 is a metallocene catalyzed ethylene/octane copolymer with a melt index of 500 grams/10 minutes using ASTM D-1238 at 190° C./2.16 kg. The density is 0.874 g/cc and the crystallinity level is 18.3 percent. It is available from Dow Chemical Co.

Affinity GA 1900 is a metallocene catalyzed ethylene/octane copolymer with a melt index of 1000 grams/10 minutes using ASTM D-1238 at 190° C./2.16 kg. The density is 0.870 g/cc with a crystallinity level of 15.8 percent. It is available from Dow Chemical Co.

Ateva 2842A is an ethylene vinyl acetate copolymer with a melt index of 400 and a vinyl acetate content of 28 percent. It is available from Celanese Corporation.

Benzoflex 352 is a solid plasticizer as described previously with a softening point of 118° C. and is available from Eastman Chemical.

Kraton D1193 is a styrene-isoprene-styrene block copolymer containing 24% styrene and 20 percent diblock. It is available from Kraton Performance Polymers.

Kraton 1657 is a SEBS block copolymer containing 13 percent styrene and 30 percent diblock. It is available from Kraton Performance Polymers.

Kraton D1161 is a SIS block copolymer with a styrene content of 15 percent and a diblock content of 19 percent. It is available from Kraton Performance Polymers.

R7352 is a 150° F. softening point paraffin wax and is available from Sasol Wax Americas.

Sylvalite 100 is a tall oil rosin ester with a 100° C. softening point and is available from Arizona Chemical.

Calsol 5550 is a napthenic process oil available from Calumet Specialty Products.

Piccotac 9095 is a aromatic modified hydrocarbon resin with a 95° C. softening point. It can be obtained from Eastman Chemical Co.

Vestoplast 708 is a amorphous polyalphaolefin available from Evonik Industries. It has a viscosity at 190° C. of about 8,000 centipoise and a R&B softening point of 106° C.

Eastoflex E1060 is a propylene based polyalphaolefin. It has a viscosity of 6000 cP at 190° C. and a R&B softening point of 135° C. It is available from Eastman Chemicals.

Escorez 2596 is an aromatic modified aliphatic hydrocarbon resin with a softening point of 96° C. It is available from ExxonMobil Chemical Co.

Sukarez SU-400 is a hydrogenated aromatic/C5/cyclic hydrocarbon resin with a softening point of 100° C. It is a available from Kolon Industries, Inc.

Sukarez SU-210 is a hydrogenated C5/cyclic hydrocarbon resin with a softening point of 110° C. It can be obtained from Kolon Industries, Inc.

Zonatac 105 is a styrenated terpene resin with a 105° C. softening point available from Arizona Chemical Co.

Elvax 150 is an ethylene/vinyl acetate copolymer made by DuPont. It has a vinyl acetate content of 33 percent and a melt flow rate of 43 grams/10 minutes using ASTM D-1238 at 190° C./2.16 kg.

TRSR TPE4202 is a linear SBS block copolymer with 40 percent styrene with essentially no diblock. It is manufactured by TSRC Corporation.

The following tests were performed on the adhesives to determine the viscosity, softening point, peel strength and cold flow.

The resulting hot melt adhesives may be then applied to substrates using a variety of application techniques. Examples include hot melt glue gun, hot melt slot-die coating, hot melt wheel coating, hot melt roller coating, melt blown coating, spiral spray and the like. In a preferred embodiment, the hot melt adhesive is sprayed onto a substrate using spiral spray, which is a preferred technique to produce a filamentary spiral pattern for elastic attachment and construction in diaper manufacturing. In one example, a hot melt coater is equipped with a disc like coating die which has a nozzle tip in the center. The tip is surrounded with a series of inclined orifices for hot air jets to pass through. The hot melt adhesive is pumped out of the nozzle in the form of a fine filament. The filament is then rotated by high-velocity hot air jets coming out of the orifices, thereby producing a helical pattern from a single strand of adhesive which is transported to the substrate. It is not the intent of this invention to provide a full description of spray techniques and the details can be found in the literature.

For the present invention, preferred methods of applying the adhesive would be by spray application, most preferably assisted by air. Among these techniques, the most common are spiral spray (Controlled Fiberization™ by Nordson), Summit™ by Nordson, Surewrap™ by Nordson, Omega™ by ITW and various melt blown processes. For the present invention, the temperature at which the hot melt adhesive is applied should be below 170° C., so that the heat sensitive substrates will not be damaged. Preferably, this temperature should be equal to or lower than 160° C., most preferably lower than 150° C.

The adhesive composition of the present invention may be used in a number of applications such as, for example, in disposable nonwoven hygienic articles, paper converting, flexible packaging, wood working, carton and case sealing, labeling and other assembly applications. Particularly preferred applications include disposable diaper and feminine sanitary napkin construction, diaper and adult incontinent brief elastic attachment, diaper and napkin core stabilization, diaper backsheet lamination, industrial filter material conversion, surgical gown and surgical drape assembly, etc. The adhesives of the present invention are particularly suited as elastic attachment and/or construction adhesives for use on disposable diapers, training pants and adult incontinent products.

Instrumental Characterization

Rheological analysis of the novel adhesive formulations described in this invention show a rapid increase in G' (storage modulus) between 30° C. and 70° C. This rapid increase in G' is characteristic of fast set speed. This increase in modulus is greater than 2 orders of magnitude.

Brookfield viscosity was tested according to ASTM D-3236 Method at 350° F. (177° C.), and are reported in centipoise (cP units).

Dynamic Temperature Step Testing

The rheology of a given hot melt adhesive can be determined using a TA Instruments rheometer, such as an Ares 3 model. For the adhesives listed in the tables below, a temperature step procedure was used to determine the storage modulus, $G^1$, at various temperatures as Well as the glass transition temperature, Tg. The instrument was set to a frequency of 10 radians per second and the temperature was varied from +140° C. to −40° C. The parallel plates used had a 25 mm diameter and a 1.6 millimeter gap. Modulus values for 70° C. and 30° C. were obtained using this test methodology.

In general, hot melt adhesives such as those described in this application, become non-tacky when the storage modulus ($G^1$) at 30° C. is greater than about $1 \times 10^6$ dynes/cm$^2$.

Performance Evaluation

Bond evaluations of the novel adhesive formulations described in this invention show superior performance over traditional EVA, APAO and SBC adhesives. Peel values using the novel adhesive formulations described in this invention show increases in strength. This increase in peel strength does not come at the expense of increased blocking and/or cold flow as is seen with traditionally formulated EVA, APAO and SBC adhesives Peel strength retention at elevated temperatures of the novel adhesive formulations described in this invention are greatly increased as compared to traditionally formulated EVA, APAO and SBC adhesives.

Example 1

The invention provides a hot melt adhesive composition, comprising a blend of the following components for use in a polypropylene nonwoven substrate lamination application. Table One shows a number of prior art examples compared to a polyethylene polymer based on metallocene catalyst technology, a tackifier, a styrenic block copolymer and a solid plasticizer.

TABLE ONE

End use Polypropylene nonwoven substrate lamination

| Raw Material | Raw Material Composition | Comparative Example 1 | Comparative Example 2 | Patent Example 1 |
|---|---|---|---|---|
| R7352 | 150 mp paraffin wax | 12% | | |
| Sylvalite 100 | 100 mp rosin ester | 42% | 57% | |
| Ateva 2842A | 28VA/42 MI EVA | 46% | | |
| Kaydol | Mineral oil | | 23% | |
| Kraton D1193 | SIS polymer | | 20% | |
| Benzoflex 352 | Solid Plasticizer | | | 7% |
| Escorez 5600 | Hydrogenated resin | | | 45% |
| Affinity GA 1900 | Metallocene polymer | | | 43% |
| Kraton G 1657 | Hydrogenated styrenic block copolymer | | | 5% |
| Set Speed | | Fast | Medium | Fast |
| Brookfield Viscosity at 325° F. | | 2000 cP | 1300 cP | 3500 cP |
| Cold flow/blocking | | Good | Poor | Excellent |
| Adhesion | | Poor | Good | Good |
| $G^1$ @ 70° C. | | N/A | 26,195 dynes/cm$^2$ | 4750 dynes/cm$^2$ |
| $G^1$ @ 30° C. | | N/A | 146,700 dynes/cm$^2$ | 3.2 × 10$^6$ dynes/cm$^2$ |
| $G^1$ @30°C. / $G^1$ @ 70° C. | | N/A | 5.6 | 673 |

Comparative Example 1 of Table 1 illustrates an EVA based composition that, although was relatively non-tacky when cool, did not spray well and had poor adhesion.

Comparative Example 2 of Table 1 illustrates an SIS based composition that, although sprayed well and had adequate adhesion, was very tacky when cool and had significant bleed through and blocking Patent Example 1 of Table 1 illustrates a polyethylene based composition in accordance with the present invention that not only sprayed well and was non-tacky when cool, but also had no bleed through or blocking issues.

Example 2

The invention provides a hot melt adhesive composition, comprising a blend of the following components for use as a pipe wrap insulation construction adhesive. Table Two shows a number of prior art examples compared to a polyethylene polymer based on metallocene catalyst technology, a tackifier, a styrenic block copolymer and a solid plasticizer.

TABLE TWO

End use Pipe Insulation wrap contruction

| Raw Material | Raw Material Composition | Comparative Example 1 | Comparative Example 2 | Patent Example 1 |
|---|---|---|---|---|
| Calsol 5550 | Mineral oil | 10% | | |
| Piccotac 9095 | Aromatic Modified C5 | 50% | | |
| Vestoplast 708 | Propylene, 1-butene ethylene terpolymer | 20% | | |
| Eastoflex E1060 | Amorphous polyolefin | 20% | | |
| Calsol 5550 | Mineral oil | | 20% | |
| Kraton D1161 | SIS polymer | | 20% | |
| Escorez 2596 | Aromatic modified aliphatic resin | | 60% | |
| Benzoflex 352 | Solid Plasticizer | | | 5% |
| Sukarez SU-400 | Hydrogenated resin | | | 50% |
| Affinity GA 1950 | Metallocene polymer | | | 40% |
| Kraton G 1657 | Hydrogenated styrenic block copolymer | | | 5% |
| Set Speed | | Slow | Medium | Fast |
| Brookfield Viscosity at 325° F. | | 1350 cP | 2400 cP | 8000 cP |
| Cold flow/blocking | | Medium | Poor | Excellent |
| Adhesion | | Good | Good | Good |
| $G^1$ @ 70° C. | | 9100 dynes/cm$^2$ | 72,400 dynes/cm$^2$ | N/A |
| $G^1$ @ 30° C. | | 7.3 × 10$^5$ dynes/cm$^2$ | 1.9 × 10$^5$ dynes/cm$^2$ | N/A |
| $G^1$ @30°C. / $G^1$ @ 70° C. | | 80.2 | 2.6 | N/A |

Comparative Example 1 of Table 2 illustrates an APAO based adhesive that, although sprayed well and had adequate adhesion, was very tacky when cool and had undesirable bleed through and blocking.

Comparative Example 2 of Table 2 illustrates an SIS based adhesive that, although sprayed well and had adequate adhesion, was very tacky when cool and had significant bleed through and blocking.

Patent Example 1 of Table 2 illustrates a polyethylene based composition in accordance with the present invention that not only sprayed well and was non-tacky when cool, but also had no bleed through or blocking issues.

Example 3

The invention provides a hot melt adhesive composition, comprising a blend of the following components for use as in as an adhesive to adhere granular material to a PE/PP substrate. Table three shows a number of prior art examples compared to a polyethylene polymer based on metallocene catalyst technology, a tackifier, a styrenic block copolymer and a solid plasticizer.

TABLE THREE

End use Adhesion of granular material to PP/PE sheet

| Raw Material | Raw Material Composition | Comparative Example 1 | Comparative Example 2 | Patent Example 1 |
|---|---|---|---|---|
| Kaydol | Mineral oil | 12% | | |
| Zonatac 105 | Styrenated Terpene | 25% | 14% | |
| Piccotac 9095 | Aromatic Modified C5 | 25% | | |

TABLE THREE-continued

End use Adhesion of granular material to PP/PE sheet

| Raw Material | Raw Material Composition | Comparative Example 1 | Comparative Example 2 | Patent Example 1 |
|---|---|---|---|---|
| Elvax 150 | 28VA/150 MI EVA | 38% | | |
| Calsol 5550 | Mineral oil | | 23% | |
| Sucorez SU210 | Hydrogenated resin | | 43% | |
| TRSR TPE4202 | SBS polymer | | 20% | |
| Benzoflex 352 | Solid Plasticizer | | | 5% |
| Escorez 5600 | Hydrogenated resin | | | 50% |
| Affinity GA 1900 | Metallocene polymer | | | 37% |
| Kraton G 1657 | Hydrogenated styrenic block copolymer | | | 8% |
| Set Speed | | Slow | Medium | Fast |
| Viscosity | | Low | Low | Low |
| Cold flow/blocking | | Poor | Poor | Excellent |
| Adhesion | | Good | Good | Good |
| $G^1$ @ 70° C. | | 21,930 dynes/cm$^2$ | 107,960 dynes/cm$^2$ | N/A |
| $G^1$ @ 30° C. | | 1.6 × 10$^6$ dynes/cm$^2$ | 378,940 dynes/cm$^2$ | N/A |
| $\frac{G^1\ @30°C.}{G^1\ @\ 70°C.}$ | | 72.5 | 3.5 | N/A |

Comparative Example 1 of Table 3 illustrates an EVA based composition that, although sprayed well and had adequate adhesion, was very tacky when cool and had significant bleed through and blocking.

Comparative Example 2 of Table 3 illustrates an SBS based composition that, although sprayed well and had adequate adhesion, was very tacky when cool and had significant bleed through and blocking.

Patent Example 1 of Table 3 illustrates a polyethylene based composition in accordance with the present invention that not only sprayed well and was non-tacky when cool, but also had no bleed through or blocking issues.

As can be seen from the above data in Tables 1-3, the ratio of the storage modulus $G^1$ at 30° C. to the storage modulus $G^1$ at 70° C. should be equal to or greater than 100, more preferably equal to or greater than 200, and most preferably equal to or greater than 500. Also, the storage modulus $G^1$ at 30° C. should be greater than 1×10$^6$ dynes/cm$^2$ in order to ensure that the adhesive is not pressure sensitive.

We claim:

1. A hot melt adhesive composition, comprising:
   (a) about 40% to 60% by weight of a metallocene catalyzed polyolefin polymer, said polyolefin polymer is a polyethylene polymer, and said polyethylene polymer is a copolymer of ethylene and octene-1 having a melt index equal to or greater than 500 g/10 min;
   (b) about 30% to 60% by weight of a tackifying resin having a softening point equal to or greater than 90° C.;
   (c) about 2% to 12% by weight of a styrenic block copolymer, said styrenic block copolymer is a styrene-ethylene-butylene-styrene (SEBS) block copolymer having a styrene content of about 10% to about 13% by weight;
   (d) about 2% to 15% by weight of a solid plasticizer having a softening point equal to or greater than 45° C.; and
   wherein the composition has a storage modulus $G^1$ at 30° C. of at least 1×10$^6$ dynes/cm$^2$, has a ratio of storage modulus $G^1$ at 30° C. to storage modulus $G^1$ at 70° C. equal to or greater than 100, is non-tacky when cool, and does not contain a wax.

2. The composition of claim 1 wherein said tackifying resin is selected from the group consisting of aliphatic and cyclo-aliphatic petroleum hydrocarbon resins, hydrogenated aliphatic and cyclo-aliphatic petroleum hydrocarbon resins, hydrogenated aromatic petroleum hydrocarbon resins, aliphatic/aromatic petroleum derived hydrocarbon resins, hydrogenated aliphatic/aromatic derived hydrocarbon resins, aromatic modified cyclo-aliphatic resins, hydrogenated aromatic modified cyclo-aliphatic resins, polyterpene resins, copolymers and terpolymers of natural terpenes, and mixtures thereof.

3. The composition of claim 1 wherein said styrenic block copolymer has a styrene content of about 13% by weight.

4. The composition of claim 1 having a viscosity of about 20,000 centipoise or less.

5. The composition of claim 1 having a viscosity of about 15,000 centipoise or less.

6. The composition of claim 1 having a viscosity of about 10,000 centipoise or less.

7. The composition of claim 1 having a ratio of storage modulus $G^1$ at 30° C. to storage modulus $G^1$ at 70° C. equal to or greater than 200.

8. The composition of claim 1 having a ratio of storage modulus $G^1$ at 30° C. to storage modulus $G^1$ at 70° C. equal to or greater than 500.

9. The composition of claim 1 wherein said solid plasticizer has a softening point equal to or greater than 60° C.

10. The composition of claim 9 wherein said solid plasticizer is selected from the group consisting of glycerol tribenzoate and 1,4-cyclohexane dimethanol dibenzoate.

* * * * *